United States Patent [19]

Lotspiech

[11] Patent Number: 5,293,472
[45] Date of Patent: Mar. 8, 1994

[54] METHOD OF GENERATING LINES AND CURVES OF USER SPECIFIED THICKNESSES ON A RASTER DEVICE

[75] Inventor: Jeffrey B. Lotspiech, San Jose, Calif.

[73] Assignee: International Business Machines Corporation, Armonk, N.Y.

[21] Appl. No.: 689,164

[22] Filed: Apr. 22, 1991

[51] Int. Cl.$^5$ .............................................. G06F 15/62
[52] U.S. Cl. .................................. 395/143; 395/142; 395/141
[58] Field of Search .............................. 395/101–103, 395/140–151

[56] References Cited

U.S. PATENT DOCUMENTS

| | | | |
|---|---|---|---|
| 4,368,462 | 1/1983 | Crawley | 340/723 |
| 4,586,037 | 4/1986 | Rosener | 340/728 |
| 4,601,002 | 7/1986 | Rosenthal | 364/518 |
| 4,672,370 | 6/1987 | Yu | 340/739 |
| 4,785,399 | 11/1988 | Evans et al. | 395/142 X |
| 4,796,020 | 1/1989 | Budrikis | 340/744 |
| 4,837,563 | 6/1989 | Mansfield | 340/732 |
| 4,849,910 | 7/1989 | Jacobs et al. | 364/519 |
| 4,905,166 | 2/1990 | Schuerman | 364/518 |
| 5,081,594 | 1/1992 | Horsley | 395/148 X |
| 5,095,520 | 3/1992 | Kim | 395/101 |
| 5,134,688 | 7/1992 | Corthout | 395/142 |

OTHER PUBLICATIONS

Abstract of Posch et al ACM Transaction (1989).
Postscript Language Reference Manual, pp. 69–70, 215 (1985).
IBM Technical Disclosure Bulletin, vol. 20, No. 12, May 1978, by A. S. Murphy "Line Thickening by Modification to Bresenham's Algorithm."
Proceedings of the Association for Computing Machinery by John D. Hobby, Apr. 1989, vol. 36, No. 2, pp. 209–229.
Curvature Continuity and Offsets for Piecewise Conics, Gerald Farin, pp. 89–99, ACM Transactions on Graphics (1989).

*Primary Examiner*—Gary V. Harkcom
*Assistant Examiner*—Almis Jankus
*Attorney, Agent, or Firm*—Baker, Maxham, Jester & Emador

[57] ABSTRACT

A method of drawing a straight or curved line of predetermined thickness on a raster device having a display or printed page consisting of a rectangular array of pels. Initially, a spine list is generated which comprises a digitization of a spine that can be swept by a preselected pen of thickness 2t centered on the spine to draw the line or "stroke." The next step is to generate penleft and penright lists representing the X and Y coordinate values of the left and right sides of the pen. Thereafter, left and right lists representing a pair of boundaries of the stroke are generated by starting at a first end of the spine list and sequentially moving toward a second end of the spine list. For each position in the spine list, the X, Y coordinate values thereof are added to the X and Y coordinate values in the penleft list. The left list is updated when any of the resulting sums yield an X value less than the current X value for the corresponding Y value in the left list. The right list is similarly updated for each position in the spine list when any of the resulting sums yield an X value more than the current X value for the corresponding Y value in the right list. Finally, the stroke is drawn by filling in between the left and right lists.

14 Claims, 1 Drawing Sheet

METHOD OF GENERATING LINES AND CURVES OF USER SPECIFIED THICKNESSES ON A RASTER DEVICE

BACKGROUND OF THE INVENTION

The present invention relates to computerized methods of generating graphic images, and more particularly, to a method of displaying or printing lines and curves of arbitrary user specified thicknesses on raster devices.

A display or printer is called a raster device if its image or printed page is made up of a grid of individual picture elements called "pels". When a conventional black and white raster device displays or prints graphic images, such as lines, circles, ellipses and other curves, it does so by blackening those pels in the raster grid that lie closest to the grid location of the line or curve. Until recently, most raster devices have drawn lines or curves that were at most a couple of pels thick. Currently, higher resolution raster devices must be capable of generating lines and curves of arbitrary user specified thickness.

The traditional method of generating a line or curve having a multi-pel thickness is to make a first trace of the line with the thickness of a pel and then to make a succession of retraces of the line or curve, each slightly displaced from the preceding trace. However, this approach rapidly becomes inefficient when the thickness is more than a couple of pels wide. Another conventional method of generating multi-pel thick lines and curves requires the determination of two curves that represent the boundaries and filling black between them. Efficient methods for filling between two curves are well known in the art. The major problem encountered with the boundary and fill method is that the two boundaries are often so mathematically complex that they are not easily determined.

One prior art approach for curve drawing approximates the curve with straight line and/or circular arc segments and determines the boundaries of those segments. The principal drawback of this method is that processing time is significant. Another prior art approach which is discussed in the publication entitled "Curvature Continuity and Offsets for Piecewise Conics" by Gerald Farin approximates the boundaries with curves that are mathematically simpler than the true curves. However, this approach, while fast, results in noticeable errors in many situations. Another prior art approach is discussed by John Hobby in his article entitled "Rasterizing Curves of Constaint Width" published in the the Journal of the Association for Computing Machinery, April 1989, Vol 36, No.2. In Hobby's method, the line or curve to be drawn is defined in terms of a polygon that can be swept to create it. The vertices of the polygon are located on the pel boundaries. This method is also computationally slow.

U.S. Pat. No. 4,601,002 of Rosenthal, granted Jul. 15, 1986, discloses a method of generating lines of variable width on a raster display utilizing an algorithm for generating symbolized lines with so-called "multiply-stroked centerline data."

U.S Pat. No. 4,849,910 of Jacobs et al, granted Jul. 18, 1989, discloses another method of generating a line segment of specific thickness on a raster device. A disk is generated having a diameter which corresponds to the thickness of the line segment. A bit representation of the disk is placed at the start point of the line segment in a bit map memory. A front section of the bit representation of the disk is stored in an intermediate memory. Thereafter, this section of the bit representation of the disk is repeatedly read out of the intermediate memory and placed in the bit memory so that the locations of these sections are related to the line center points of the line segment in consecutive raster lines.

U.S. Pat. No. 4,905,166 of Schuerman, granted Feb. 27, 1990, discloses another method of generating a line part having a given thickness with a raster device, such as a laser printer. Boundaries are determined and a line is drawn based upon generation of a circle and the use of the Bresenham algorithm.

SUMMARY OF THE INVENTION

It is therefore the primary object of the present invention to provide an improved method of generating lines and curves of varying thickness on a raster device.

The present invention provides a method of drawing a straight or curved line of predetermined thickness on a raster device having a display or printed page consisting of a rectangular array of pels. Initially, a spine list is generated which comprises a digitization of a spine that can be swept by a preselected pen of thickness 2t centered on the spine to draw the line or "stroke." The next step is to generate penleft and penright lists representing the X and Y coordinate values of the left and right sides of the pen. Thereafter, left and right lists representing a pair of boundaries of the stroke are generated by starting at a first end of the spine list and sequentially moving toward a second end of the spine list. For each position in the spine list, the X, Y coordinate values thereof are added to the X and Y coordinate values in the penleft list. The left list is updated when any of the resulting sums yield an X value less than the current X value for the corresponding Y value in the left list The right list is similarly updated for each position in the spine list when any of the resulting sums yield an X value more than the current X value for the corresponding Y value in the right list. Finally, the stroke is drawn by filling in between the left and right lists.

DESCRIPTION OF THE PREFERRED EMBODIMENTS

Figure 1:
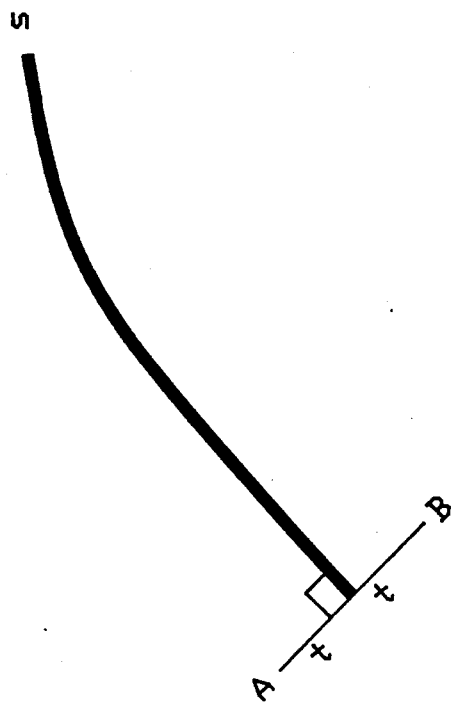
FIG. 1 illustrates the generation of penleft and penright lists representing two sides of a pen in accordance with the present invention.

As used herein, the term "stroke" refers to a line or curve of arbitrary user specified thickness. Such a stroke can be generated, in a raster device, by sweeping the tip of an imaginary stylus along the path of the curve in the raster. The imaginary stylus tip may be called a "pen". In the practice of the invention, the "pen" is assumed to have a circular outline with a diameter equal to the thickness of the stroke. The pen is swept such that the center of the circle traverses the midline of the curve, which is called the "spine" of the curve. The area swept out by the pen is the desired stroke. Current methods for implementing strokes concentrate on finding the two curves that represent the boundaries of the stroke and filling between them. The present invention utilizes the same general approach, but differs in that it provides an improved method for finding the boundaries of the stroke.

If the stroke is a straight line, the two boundaries are straight lines. If the stroke is a circular arc, the two boundaries are circular arcs. However, for all the rest of the strokes of interest, the determination of the boundaries is more complex. For example, the two boundaries of an elliptical stroke are not ellipses. In fact, they are so complex mathematically that there is no easy method for generating them. The same is also true for many other strokes displayed or printed in modern computer applications.

A raster display or a page printed on a raster printer is formed of a rectangular array of pels. Each pel is represented by an amount of memory which, in a black and white raster device, is a single bit which tells whether or not the pel should be black or white. A conventional raster device has an X, Y coordinate system to locate pels in the raster grid, wherein the pels are typically one unit long.

The spine of a stroke to be drawn intersects a subset of the grid of pels. Thus, the spine can be represented by a list of the integer X, Y coordinates of the pels which intersect the spine. This list is referred to as the "spine list". The X, Y coordinates are digitized and represented in binary form. Generation of the spine list is thus referred to as "digitization" of the spine. For purposes of the present invention, "digitization" is restricted to the situation where the difference between the Y values of any two successive positions in the digitization is a constant. There are many efficient algorithms which are known by persons of skill in the art to digitize various useful curves which can function as spines When the Y values in a digitization are chosen such that they are sequential integers, they no longer need to be stored, and the list can consist of the X values alone and a notation of the starting Y and ending Y. This form of X, Y list is referred to in the art as a "run end." Considering a run end list to be a spine, the starting and ending Y values can be specified as spine.startY and spine.endY, respectively. For any Y in the range, the corresponding X value can be denoted by spine[Y]. Thus, given an arbitrary diameter value 2t for a circular pen and a run end list spine which describes a spine, the problem is to produce two new run end lists, left and right, which represent the two boundaries of a stroke of that thickness along that spine.

In accordance with a first embodiment of the present invention, two lists, penleft and penright, both of equal size, are generated. These lists may represent the two sides of a circle of radius t centered on 0, 0. It should be understood that other pen shapes may be used, such as an ellipse or a polygon. FIG. 1 illustrates the generation of the penleft and penright lists for a circular pen having a radius t=2 between y=2 and y=−2. The circle is represented in digitized form as a cross labeled P. The next step is to initialize the left and right lists so that they have nil values for X. The nil values are picked so that minimum (X, nil)=X for the left edge and maximum (X, nil)=X for the right edge. The Y range of these lists will be: [spine.startY+penleft.startY: spine.endY+penleft.endY].

The next step is to repetitively move the circular pen along the spine. Preferably this movement is from bottom to top relative to the overall display or printed page. Considering first the left edge of the stroke, each X value in the constructed left list will be the minimum, i.e., leftmost, of every possible placement of the circle that could contribute to that position in the list. Therefore, at each (X, Y) value in the spine, the successive (X, Y) values in the penleft list are added to the spine (X, Y) values, generating a temporary $(X_T, Y_T)$. The $X_T$ is compared with the current values stored in the left list at $Y_T$ to see if the new value is further to the left (smaller X). If it is, then the left list is updated at that position with the $X_T$. Table 1 below sets forth an example of pseudo-code for performing the foregoing operation.

TABLE I

Y ← spine.startY;
  while (Y ≤ spine.endY) begin
    penY ← penleft.startY;
    while (penY ≤ penleft.endY) begin
      left [Y + penY] ← minimum (left[Y + penY], spine [Y]
        + penleft [penY]);
      penY ← penY + 1
    end
  Y ← Y + 1;
end The right list is updated in a similar manner, except that new values further to the right (greater X) are of interest. The effect of this is to leave the left list with the left-most values for all the placements of the circle along the spine. The action of running through the penleft and penright lists for each sequential position in the spine list may be analogized to the movement of a windshield wiper that is anchored at the center of the pen and is moved up one step along the spine after each wipe. In this analogy the area swept by the windshield wiper is the area of the stroke.

Figure 2:
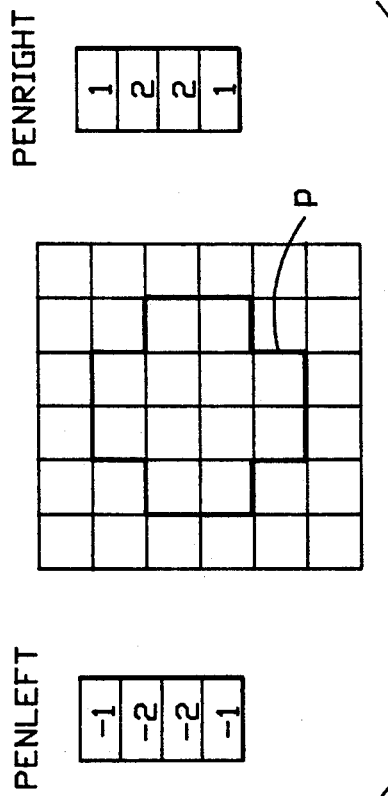
FIG. 2 illustrates the generation of a stroke by sequential movement of a circular pen in accordance with the present invention.

The first embodiment of the present invention described above is efficient for small pens, e.g. circles of relatively small radius t. However, the speed of this method degrades proportionally as the size of the pen increases. A second embodiment of the present invention is based upon the observation that at any particular spine position, it is rare that more than a few elements in the spine list will cause the left or right lists to be updated. FIG. 2 illustrates the successive placement of a circular pen C in overlapping fashion, along a spine S. Considering the left edge only, on average, on any given circle, only a small arc A on the circumference of the circle becomes part of the boundary of the stroke. This small arc may be referred to as the "critical arc." Moving from left to right in FIG. 2, a given point is below the critical arc if it is inside the previous circle and above the critical arc if inside the subsequent circle. In terms of the pen run end lists, it is only necessary to use penY values that correspond to the critical arc. The condition of being inside the previous circle is: spine-[Y]+penleft[penY]>left[Y+penY]. Likewise, the condition of being inside the subsequent circle is: spine-[Y]+penleft[penY]>spine[Y+1]+penleft[penY−1]. The foregoing equations provide an indication of when to stop decrementing or incrementing penY.

The second embodiment of the present invention may be implemented with the pseudo-code of Table II, set forth below:

TABLE II

Y ← spine.startY;

TABLE II-continued

```
penY ← penleft.startY;
while (Y ≦ spine.endY) begin
    while (spine[Y] + penleft[Y] left[Y + penY] begin
        left[Y + penY] ← spine[Y] + penleft[penY];
        penY ← penY - 1;
    end
    while (spine [Y] + penleft[penY + 1] ≦ spine[Y + 1] +
        penleft[penY] begin
        penY ← penY + 1;
        left[Y + penY] ← minimum(left[Y + penY], spine[Y] +
            penleft[penY]);
    end
    Y ← Y + 1;
end
```

The pseudo-code of Table II has a main loop which moves the pen up the spine (increasing Y). For each pen placement, the ending point (penY value) of the previous wipe is used an estimate as to where the current wipe should begin. Since there is no previous wipe at the bottom of the spine (at spine.startY) the wipe is begun at (penY is set to) the bottom of the pen (penleft.startY). Each wipe therefore consists of two loops. The first loop moves the wiper downward (decreasing penY) until the envelope of the previous circle placements is encountered. Then, the second loop moves the wiper upward (increasing penY) until the envelope of the next higher circle placement is encountered. Finally, the Y value is incremented up the spine and the process is repeated. This continues until the top of the spine is reached The pseudo-code of Table II has been simplified to clarify the second embodiment of the present invention. Checking to see if the range of the spine, the penleft, and the left list has been exceeded is not addressed in this pseudo-code The implementation of such checks is straightforward for one skilled in this art. Alternatively, these lists could be extended outside their nominal range with appropriate nil values so that the tests shown in the loop will not cause the left lists to be updated incorrectly. In this latter case, the pseudo-code of Table II would not need to be modified.

The second embodiment of the present invention greatly restricts the number of penleft positions that need to be compared with the spine list at any point along the spine. However, it is possible that in this restricted range every penleft position would have to be visited twice, once in the penY decrement loop, and again in the penY increment loop. A third embodiment of the present invention described hereafter guarantees that each penleft position need be visited only once. Where the critical arc lies on the circular pen is strongly dependent on the slope of the spine. At any point the critical arc lies roughly perpendicular to the spine. It is difficult to calculate the slope of the spine. However, it is easy to calculate the "partial differences" of the spine, which can be used to determine how the spine slope is changing. The difference between two successive values in the spine list may be returned to as "dx". If the current dx is greater than the previous dx, the spine is bending right, and the critical arc can only move up. If it is less, the spine is bending left, and the critical arc can only move down. If the two dx values are equal, the critical arc cannot change. This fact can be used to restrict the stop test to at most one direction.

If the slope of the spine is not changing (dx=olddx), then each positioning of the pen on the spine contributes at most one value to the left edge. The left edge is affected by multiple values of pen only when the slope changes. Pseudo-code for this method is set forth in Table III, hereafter:

TABLE III

```
Y ← spine.startY;
penY ← penleft.startY;
dx ← 0;
olddx ← SMALL;  /* a very large negative number */
while (Y ≦ spine.endY + 1) begin
    if (dx < olddx) then
        while (spine[Y] + penleft[penY] ≦ left[Y + penY]) begin
            left[Y + penY] ← spine[Y] + penleft[penY];
            penY ← penY - 1;
        end
    else begin  /* dx ≧ olddx here */
        if (dx > olddx) then begin
            while (spine[Y-1] + penleft[penY] ≦ spine[Y] +
                penleft[penY + 1]) begin
                left[Y - + penY] ← minimum (left[Y - 1 + penY],
                    spine[Y - 1] + penleft[penY]);
                penY ← penY + 1;
            end
            penY = maximum (minimum(penY, penleft, endY),
                penleft.startY);
            left[Y + penY] ← minimum (left[Y + penY], spine [Y] +
                penleft[penY])
        end
    Y ← Y + 1;
    olddx ← dx;
    dx ← spine[Y] - spine [Y - 1];
end
```

The pseudo-code of Table III has two loops, much like the pseudo-code of Table II, but only one or the other loop is used when the slope changes. If the spine bends left (dx<olddx), then the wiper (penY) is swept toward the bottom of the pen until the envelope of the previous sweeps is encountered. If the spine bends right (dx>olddx), then the wiper will be swept upward until it encounters the envelope of the next pen placement. When the spine bends right (after a segment of constant slope), it is possible that the wiper on the previous pen placement (Y−1) was not left at the top of the critical arc. Therefore, it is necessary to first sweep the wiper through the critical region for the previous placement before adding an edge value for the current placement.

It is important that penY be left somewhere on the circle for the constant slope (dx=olddx) case. The pseudo-code of Table III includes a statement to guarantee this. As in the pseudo-code of Table II, the other range checks are implicit. It may be assumed that the spine, penleft, and left lists have been initialized with appropriate values outside of their nominal Y range so that the penleft list is correctly updated in all cases. (In particular, it is important that spine[spine.endY+1] contain a large 'right' position, so that on the final pass through the loop, the remaining top of the pen is swept.) Alternatively, explicit range checks could be added to the code of Table III. Since the circular pen is symmetric, the left edge and the right edge are the reverse of each other, i.e., if penY increases from the left edge, it decreases for the right edge and vice versa. Thus, it is possible to construct both the left and right lists in the same loop and perform the "stop" testing only once.

The embodiments described above depend upon the spine being monotonic in Y. A single curve that is not monotonic, such as "U" shaped curve can be broken into two spine lists, one for each side of the "U". This is a necessary by-product of producing run end lists as the output of curve digitization. In the case of multiple spine lists, each can be stroked by one of the three embodiments described above, and the results combined with a conventional "area union" algorithm. Any rectangular areas of height 2t necessary to connect the artificially separated spine lists must be included.

Most raster devices use a so-called "crack and edge" coordinate system. According to this system, integer (X, Y) values lie on the cracks between pels. It is possible to interpret a single value $x_0$ in a run end list at entry $y_0$ as two points, $(x_0, y_0)$ and $(x_0, y_0+1)$. However, this does not make it necessary to calculate two placements of the circle for each spine position. It is simpler and more efficient to split the circle in half horizontally and add the one unit of height between the two halves before beginning. This vertical stretching of the circular pen makes each single placement of the circle, in the embodiments described above, logically equivalent to the two placements required. This stretching can be done by any number of "area union" algorithms well known in the art.

Figure 3:
FIG. 3 illustrates the end of a spine segment and the location of A and B points utilized in joining with another spine segment.

The embodiments described above produce strokes where the ends of the strokes are round, and where distinct segments in the spine are joined by round joins. In conventional page description languages, this is just one of the styles that can be specified. If the user has requested a different style, for example flush caps and miter joins, it is necessary to adjust the penleft and penright lists to reflect the requested style. Referring to FIG. 3, this is done by calculating the A and B points for the spine segment S, calculating the A and B points for the adjacent segment in the case of a join, and generating straight lines involving the A and/or B points. The A and B points could be calculated based on the given geometry, including the distance t from the endpoint of the spine segment and perpendicular to the slope of the spine at that point. This calculation is slow because it involves taking a square root and it is not satisfactory for strokes generated with the embodiment described above. This is because the fractional pel precision of A and B that result from this calculation will sometimes cause cosmetic problems when the joins or caps are matched with the rest of the stroke. It is possible due to round off error, that the calculated points will lie outside of the penleft or penright lists. However, since only the points actually on the pen that are closest to A and B are of interest, they can be rapidly calculated as follows. If two slopes $(dx_1, dy_1)$ and $(dx_2, dy_2)$ are perpendicular, their dot product is zero. For each point on the perimeter of the pen, the (dx, dy) of that point may be calculated and saved. When it is necessary to find the A and B points for an arbitrary slope $(dx_0, dy_0)$, these can be calculated from the saved (dx, dy) whose dot product with the incoming slope is closest to zero. Its corresponding point and its opposite point on the pen perimeter are the desired A and B points.

In some cases, the transformation between user coordinates and device coordinates is not uniform in X and Y. This can occur because the raster device has asymmetrical pels or simply because the user requested it to get a special graphic effect. In such cases, circular pens in user space become elliptical in device space, and lines perpendicular in user space are no longer perpendicular in a device space. However, the transformations in X and Y are carried out in normal fashion, and the resulting elliptically shaped pen is stored rather than the circular shaped one. The stored (dx, dy) values also include the effect of this transformation.

The embodiments described above were actually implemented in C source code and run on the control unit of an IBM 4019 laser printer having a MOTOROLA 68000 processor. When compared against one of the aforementioned prior art approaches run on the same hardware, measurements indicated that the present invention was capable of running approximately three times faster than the prior art approach on a mix of four hundred circles of random thickness and random radii.

Figure 4:
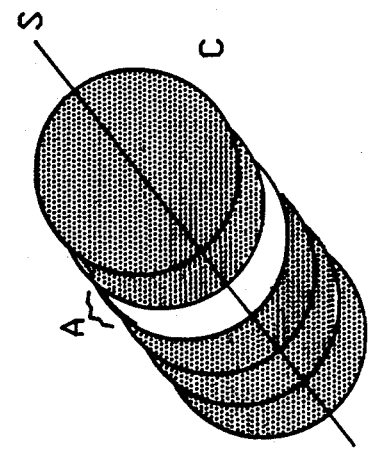
FIG. 4 illustrates a system for implementing the invention.

The block diagram of a system implementing the invention is illustrated in FIG. 4. In FIG. 4, such a system includes an input system 10 for generating display commands and parameter values, a graphics processor 12 which receives the commands and parameter values from the input system 10, and an output device 16 with the capability of drawing lines and curves in response to graphics processor outputs. In this regard the graphics processor 12 and output device 16 are embodied in the above-mentioned IBM 4019 laser printer. The input parameters and commands for drawing curves are received from the input system, which can include processor of the personal system (PS) type with the ability to execute drawing applications in response to user prompts and inputs. Preferably, the invention would be embodied in a drawing program executed by the graphics processor in response to user-specified parameter values received from the input system 10. In this regard, the user would specify the desired thickness of a line or curve to be drawn, with the thickness value being used by the graphics processor to set the limits of processing for generating the penleft and penright lists. All lists, including the spine, penleft, penright, left and right lists are generated by the graphics processor 12, the lists being used then to control the drawing of specified lines and curves by the output device.

As with any method of drawing curves on raster devices, there is a measurable error between my method and the mathematically correct result. The maximum error is simply the sum of the maximum error in the digitization of the spine with maximum error in the digitization of the pen. The amount of this error depends on the nature of the digitization algorithms, which are not the subject of the present invention. This error is typically on the order of one-half pel for both the spine and pen digitization algorithms. It will be apparent to those skilled in the art that the error that results in practicing my invention can be reduced by decreasing the step size in the run end lists, e.g. one-half pel steps, one-quarter pel steps, etc. Likewise, the performance of the method of my invention can be improved at the cost of increased error by increasing the granularity of the lists, for example, double pel, triple pel, etc.

While I have described several preferred embodiments of the present invention, it should be understood that further modifications in arrangement and detail will occur to those skilled in the art. The pen shape need not be circular or even elliptical. Any arbitrary pen shape, including disjoint areas, can be swept along a spine in accordance with the present invention. With the preferred embodiments described, it is only required that the pen shape be convex. Where the pen is symmetrical, such as a circle, only one of the left and right lists need ever be actually generated. Accordingly, the protection afforded my invention should only be limited in accordance with the scope of the following claims:

I claim:

1. In a graphics processing system including a graphics processor and a raster device, a method of drawing a straight or curved stroke of predetermined thickness on a rectangular array of pels, comprising the steps of:
  in the graphics processor:
    generating a spine list comprising a digitization of a spine that can be swept by a preselected pen of thickness 2t centered on the spine to draw the stoke, the spine list including a set of X, Y coordinate values of a set of the pels in the array intersected by the spine;
    generating a penleft list and a penright list, the penleft list including X, Y coordinate values of the left side of the pen and the penright list including X, Y coordinate values of the right side of the pen, respectively; and
    generating left and right lists representing a pair of boundaries of the stroke by starting at a first end of the spine list and moving toward a second end of the spine list and for each sequential position in the spine list adding the X, Y coordinate values thereof to the X, Y coordinate values in the penleft list and updating the left list when any of the resulting sums yields an X value less than the current X value for the corresponding Y value in the left list and updating the right list when any of the resulting sums yields an X value more than the current X value for the corresponding Y value in the right list; and
  drawing the stroke with the raster device by filling in pel positions between the pair of boundaries represented by the left and right lists.

2. A method according to claim 1 wherein the generation of the left and right lists is accomplished by restricting the number of values of the penleft and penright lists that are summed dependent upon the geometry of the pen and the current values in the left and right lists.

3. A method according to claim 1 wherein the generation of the left and right lists is accomplished by restricting the number of values of the penleft and penright lists that are summed dependent upon a slope at each position on the spine list.

4. A method according to claim 1 wherein the generation of the left and right lists is accomplished by restricting the number of values of the penleft and penright lists that are summed dependent upon 1) the geometry of the pen: 2) the current values in the left and right lists; and 3) a slope at each position of the spine list.

5. A method according to claim 1 wherein the pen is circular.

6. A method according to claim 1 wherein the pen is elliptical.

7. A method according to claim 1 wherein the pen is symmetrical and only one of the left and right lists is generated.

8. A method according to claim 1 wherein the stroke is first broken into segments and spine, left and right lists are generated for each segment.

9. A method according to claim 1 wherein during the generation of the left and right lists, only predetermined subsets of the penleft and penright lists are compared to the spine list.

10. A method according to claim 1 wherein each X, Y coordinate value of the penleft list is only used once for each position in the spine list.

11. A method of drawing a straight or curved stroke on a matrix of pels by a machine including a graphics processor and an output device, the method including the steps of:
  in the graphics processor:
    generating a pair of lists (penleft and penright) which represent the tip of a pen, the penleft list including X, Y coordinates in the matrix for the left side of the tip and the penright list including X, Y coordinates in the matrix of the right side of the tip;
    generating a spine list, the spine list including a sequence of X, Y coordinate values of a set of pels in the matrix which represent a curve drawn in the matrix by the tip;
    generating a pair of lists (left and right) representing respective boundaries of a stroke for drawing the curve, the left and right lists being generated by starting at a spine list coordinate value representing a first end of the spine and proceeding through the sequence of coordinate values toward a spine list coordinate value representing a second end of the curve, and, for each coordinate value in the sequence of coordinate values, adding the X, Y coordinate values thereof to the X, Y coordinate values in the penleft list and updating the left list when any of the resulting sums yield a X value less than the current X value for the corresponding Y value in the left list and updating the right list when any of the resulting sums yield an X value greater than the current X value for the corresponding Y value in the right list; and
    coloring all pels in the matrix of pels at coordinate positions between the coordinate positions in the left and right lists; and
  drawing the stroke with the output device in response to pels colored in the coloring step.

12. The method of claim 11, wherein the pen tip is circular.

13. The method of claim 11, wherein the pen tip is elliptical.

14. The method of claim 11, wherein the pen tip is symmetrical and only the left or the right list is generated.

* * * * *